United States Patent
Pannell et al.

(10) Patent No.: US 10,414,843 B2
(45) Date of Patent: Sep. 17, 2019

(54) SPRAY DRIED CATALYST COMPOSITIONS, METHODS FOR PREPARATION AND USE IN OLEFIN POLYMERIZATION PROCESSES

(71) Applicant: Univation Technologies, LLC, Houston, TX (US)

(72) Inventors: Richard B. Pannell, Kingwood, TX (US); Michael D. Awe, Middlesex, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 15/556,659

(22) PCT Filed: Mar. 10, 2016

(86) PCT No.: PCT/US2016/021746
§ 371 (c)(1),
(2) Date: Sep. 8, 2017

(87) PCT Pub. No.: WO2016/145179
PCT Pub. Date: Sep. 15, 2016

(65) Prior Publication Data
US 2018/0051111 A1    Feb. 22, 2018

Related U.S. Application Data

(60) Provisional application No. 62/130,839, filed on Mar. 10, 2015.

(51) Int. Cl.
*C08F 4/642* (2006.01)
*C08F 4/6592* (2006.01)
*C08F 210/16* (2006.01)
*C08F 4/659* (2006.01)
*B01J 37/02* (2006.01)

(52) U.S. Cl.
CPC ......... *C08F 210/16* (2013.01); *B01J 37/0236* (2013.01); *C08F 4/65912* (2013.01); *C08F 4/65916* (2013.01); *C08F 4/65925* (2013.01)

(58) Field of Classification Search
CPC .............. C08F 4/65916; C08F 4/64089; C08F 4/65912
See application file for complete search history.

(56) References Cited

U.S. PATENT DOCUMENTS

| | | | |
|---|---|---|---|
| 5,942,587 | A | 8/1999 | Arjunan et al. |
| 6,124,229 | A | 9/2000 | Becker et al. |
| 6,936,226 | B2 | 8/2005 | Agapiou et al. |
| 2011/0130531 | A1 | 6/2011 | Hussein et al. |
| 2013/0310526 | A1 | 11/2013 | Jorgensen |
| 2015/0133615 | A1 | 5/2015 | Mariott et al. |

OTHER PUBLICATIONS

International Preliminary Report on Patentability for related PCT Application PCT/US2016/021746, dated Sep. 21, 2017 (8 pgs).
International Search Report & Written Opinion for related PCT Application PCT/US2016/021746, dated Jul. 6, 2016 (11 pgs).

*Primary Examiner* — Caixia Lu
(74) *Attorney, Agent, or Firm* — Brooks, Cameron & Huebsch, PLLC

(57) ABSTRACT

Methods of preparing supported catalyst compositions using spray drying are disclosed. The supported catalyst compositions find use in the polymerization of olefins.

17 Claims, No Drawings

SPRAY DRIED CATALYST COMPOSITIONS, METHODS FOR PREPARATION AND USE IN OLEFIN POLYMERIZATION PROCESSES

This application is a National Stage Application under 35 U.S.C. § 371 of International Application Number PCT/US2016/021746, filed Mar. 10, 2016 and published as WO 2016/145179 on Sep. 15, 2016, which claims the benefit to U.S. Provisional Application 62/130,839, filed Mar. 10, 2015, the entire contents of which are incorporated herein by reference in its entirety.

FIELD

The present disclosure relates to spray dried catalyst compositions, methods for their preparation and to their use in processes for polymerizing olefins. In particular, the disclosure relates to spray dried catalyst compositions comprising methylalumoxane and metallocene type catalysts and/or conventional-type transition metal catalysts.

BACKGROUND

A major focus of the polyolefin industry in recent years has been on the development of new catalysts that deliver new and improved products. Transition metal catalysts, such as, for example, metallocene catalysts, are now widely used to produce polyolefin polymers, such as polyethylene polymers. Transition metal catalysts generally require an activator or cocatalyst in order to achieve commercially acceptable activity levels. Exemplary activators include methylalumoxane (MAO) and molecular activators or co-catalysts such as Lewis acidic boranes.

Further, for use in particle forming polymerization processes, such as gas phase processes, transition metal catalysts are typically supported on a particulate carrier. Often, the supported transition metal catalyst is utilized in the form of a free flowing powder requiring that the supported catalyst is vacuum dried during manufacture so as to remove the liquid diluent in which the catalyst is prepared. At commercial scale, where supported catalyst batch size may be of the order of 200 kg of solids or more, the vacuum drying step can be extremely time consuming, particularly where relatively high boiling point liquids, such as toluene, have to be removed. WO 99/26989 describes the preparation of a supported metallocene catalyst of about 550 kg batch size where the catalyst is prepared in toluene and then vacuum dried for at least 15 hours. WO 99/61486 describes the preparation of a supported metallocene catalyst also of about 550 kg batch size where the catalyst is vacuum dried for 15 hours. Such long drying times have a clear negative impact on the economics of catalyst production.

Therefore, it would be desirable to provide lower cost processes for preparing supported transition metal catalysts at large scale which also deliver catalysts capable of operating in a polymerization process with good productivity.

SUMMARY

The present disclosure provides for a lower cost process for preparing supported catalyst compositions for olefin polymerization where the process provides for a faster way to dry large volumes of the supported catalyst composition without altering the catalyst performance. In one aspect there is provided a method for producing the supported catalyst composition for olefin polymerization comprising the steps of:

a) forming a suspension comprising one or more porous particulate supports, one or more activator compounds and one or more catalyst compounds in one or more liquid diluents; and b) spray drying the suspension to form a supported catalyst composition;

wherein step b) is performed at a rate sufficient to produce at least 200 kg of supported catalyst composition in a time of 10 hours or less. The spray drying step allows for large scale rapid drying of the suspension formed in step a) to yield the supported catalyst composition with an overall shorter batch process time.

Step b) may be performed at a rate sufficient to produce at least 200 kg of supported catalyst composition in a time of 9 hours or less, or 8 hours or less, or 7 hours or less, or 6 hours or less, or 5 hours or less, or 4 hours or less, or 3 hours or less.

Forming the suspension in step a) may be performed in a time of 9 hours or less, or 8 hours or less, or 7 hours or less, or 6 hours or less, or 5 hours or less, or 4 hours or less, or 3 hours or less.

The supported catalyst composition may have a residual liquid content after spray drying of 10% by weight or less, or 7% by weight or less, or 5% by weight or less, or 4% by weight or less, or 3% by weight or less, or 2% by weight or less.

Step b) may be performed at a rate sufficient to produce at least 300 kg of supported catalyst composition, or at least 400 kg, or at least 500 kg, in a time of 10 hours or less.

An advantage of the presently disclosed methods is that drying of the supported catalyst composition to acceptably low levels of residual diluent may be achieved in significantly shorter times than with conventional vacuum drying methods.

For example, a supported catalyst composition having a batch size (total solids content) of about 550 kg may be spray dried from a toluene suspension in about 5 hours. This may compare to about 15 hours of drying time using conventional vacuum drying.

The time taken for step a) may be substantially the same as the time taken for step b). The time taken for step a) may be within 2 hours of the time taken for step b). The time taken for step a) may be within 1 hour of the time taken for step b).

Further, and surprisingly, supported catalyst compositions prepared by the presently disclosed methods may have equivalent or higher activities in olefin polymerization than catalyst compositions prepared by conventional vacuum drying methods.

The suspension may have a weight percent of solids in the liquid diluent between about 5% by weight and about 60% by weight, or between about 10% by weight and about 50% by weight, or between about 20% by weight and about 40% by weight.

The suspension may be spray dried at a rate between about 100 kg/hr and 1000 kg/hr, or between about 200 kg/hr and about 800 kg/hr.

The porous particulate support may comprise a particulate Group 2, 3, 4, 5, 13 and 14 oxide or chloride. The porous particulate support may comprise a particulate silica. The porous particulate support may be dehydrated at an elevated temperature.

The porous particulate support may have an average particle size in the range of from about 0.1 to about 500 µm, or from about 1 to about 200 µm, or from about 1 to about 50 µm, or from about 5 to about 50 µm.

The one or more activator compounds may comprise an organometallic compound. The one or more activator compounds may comprise an alumoxane or a neutral or ionic stoichiometric activator. The one or more activator compounds may comprise methylalumoxane or modified methylalumoxane.

The liquid diluent may comprise an aliphatic or aromatic hydrocarbon. The liquid diluent may comprise toluene.

The one or more catalyst compounds may comprise a titanium, a zirconium, or a hafnium atom. The supported catalyst composition may comprise two or more catalyst compounds comprising a titanium, a zirconium, or a hafnium atom.

The catalyst compound may comprise:
(pentamethylcyclopentadienyl)(propylcyclopentadienyl) $MX_2$,
(tetramethylcyclopentadienyl)(propylcyclopentadienyl) $MX_2$,
(tetramethylcyclopentadienyl)(butylcyclopentadienyl) $MX_2$,
$Me_2Si(indenyl)_2MX_2$,
$Me_2Si(tetrahydroindenyl)_2MX_2$,
(n-propyl cyclopentadienyl)$_2MX_2$,
(n-butyl cyclopentadienyl)$_2MX_2$,
(1-methyl, 3-butyl cyclopentadienyl)$_2MX_2$,
$HN(CH_2CH_2N(2,4,6-Me_3phenyl))_2MX_2$,
$HN(CH_2CH_2N(2,3,4,5,6-Me_5phenyl))_2MX_2$,
(propyl cyclopentadienyl)(tetramethylcyclopentadienyl) $MX_2$,
(butyl cyclopentadienyl)$_2MX_2$,
(propyl cyclopentadienyl)$_2MX_2$, and mixtures thereof, wherein M is Zr or Hf, and X is selected from F, Cl, Br, I, Me, benzyl, $CH_2SiMe_3$, and
$C_1$ to $C_5$ alkyls or alkenyls.

The method may comprise any one or more of the above disclosed features in any combination.

In another aspect there is provided a supported catalyst composition for olefin polymerization formed by any one of the hereinbefore disclosed methods.

In another aspect there is provided a process for polymerizing olefins, the process comprising:
contacting olefins with one or more supported catalyst compositions prepared by any one of the methods as hereinbefore disclosed in a reactor under polymerization conditions to produce an olefin polymer or copolymer

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, transition metal compounds, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

Disclosed herein are advantageous methods for the preparation of supported catalyst compositions for the polymerization of olefins. The methods are characterized in that they utilize spray drying as a step in the catalyst preparation. The supported catalyst compositions may be prepared in much shorter times relative to previously described methods and are capable of operating in a polymerization process continuously with good productivity.

Catalysts

Any catalyst or combination of catalysts utilized to polymerize olefins is suitable for use in the methods of the present disclosure. The following is a discussion of various catalysts set forth for the purpose of explanation and not limitation.

General Definitions

As used herein, a "supported catalyst composition" includes one or more catalyst compounds utilized to polymerize olefins and at least one activator or, alternatively, at least one cocatalyst, and at least one support. The supported catalyst composition may include any suitable number of catalyst compounds in any combination as described herein, as well as any activator or cocatalyst in any combination as described herein. A "supported catalyst composition" may also contain one or more additional components known in the art to reduce or eliminate reactor fouling such as continuity additives.

As used herein, a "catalyst compound" may include any compound that, when activated, is capable of catalyzing the polymerization or oligomerization of olefins, wherein the catalyst compound comprises at least one Group 3 to 12 atom, and optionally at least one leaving group bound thereto.

Conventional Catalysts

Conventional catalysts are those traditional Ziegler-Natta catalysts and Phillips-type chromium catalyst well known in the art. Examples of conventional-type transition metal catalysts are disclosed in U.S. Pat. Nos. 4,115,639, 4,077,904 4,482,687, 4,564,605, 4,721,763, 4,879,359 and 4,960,741. The conventional-type transition metal catalyst compounds that may be used in the present invention include, but are not limited to, transition metal compounds from Groups III to VIII of the Periodic Table of the Elements.

These conventional-type transition metal catalysts may be represented by the formula: $MR_x$, where M is a metal from Groups IIIB to VIII, preferably Group IVB, more preferably titanium; R is a halogen or a hydrocarbyloxy group; and x is the valence of the metal M. Non-limiting examples of R may include alkoxy, phenoxy, bromide, chloride and fluoride. Conventional-type transition metal catalysts where M is titanium may include, but are not limited to, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.⅓AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566. The $MgTiCl_6$ (ethyl acetate)$_4$ derivative is one such example. British Patent Application 2,105,355 describes various conventional-type vanadium catalyst compounds. Non-limiting examples of conventional-type vanadium catalyst compounds include vanadyl trihalide, alkoxy halides and alkoxides such as $VOCl_3$, $VOCl_2(OBu)$ where Bu=butyl and $VO(OC_2H_5)_3$; vanadium tetra-halide and vanadium alkoxy halides such as $VCl_4$ and $VCl_3(OBu)$; vanadium and vanadyl acetyl acetonates and chloroacetyl acetonates such as $V(AcAc)_3$ and $VOCl_2(AcAc)$ where (AcAc) is an acetyl acetonate. Examples of conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, iso-butyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention may include $CrO_3$, chromocene, silyl chromate, chromyl chloride ($CrO_2Cl_2$), chromium-2-ethylhexanoate, chromium acetylacetonate ($Cr(AcAc)_3$), and the like. Non-limiting examples are disclosed in, for example, U.S. Pat. Nos. 3,242,099 and 3,231,550.

Still other conventional-type transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436. The conventional-type transition metal catalysts of the invention may also have the general formula $M'_1M''X_{2t}Y_uE$, where M' is Mg, Mn and/or Ca; t is a number from 0.5 to 2; M" is a transition metal Ti, V and/or Zr; X is a halogen, preferably Cl, Br or I; Y may be the same or different and is halogen, alone or in combination with oxygen, $-NR_2$, $-OR$, $-SR$, $-COOR$, or $-OSOOR$, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoramides, (h) esters of phosphoric and phosphorus acid, and (j) phosphorus oxy-chloride. Non-limiting examples of complexes satisfying the above formula include: $MgTiCl_5 \cdot 2CH_3COOC_2H_5$, $Mg_3Ti_2Cl_{12} 7CH_3COOC_2H_5$, $MgTiCl_5 \cdot 6C_2H_5OH$, $MgTiCl_5 \cdot 100CH_3OH$, $MgTiCl_5$ tetrahydrofuran, $MgTi_2Cl_{12} 7C_6H_5CN$, $MgTi_2Cl_{12} 6C_6H_5COOC_2H_5$, $MgTiCl_6 2CH_3COOC_2H_5$, $MgTiCl_6 6C_5H_5N$, $MgTiCl_5(OCH_3)2CH_3COOC_2H_5$, $MgTiCl_5N(C_6H_5)_2$ $3CH_3COOC_2H_5$, $MgTiBr_2Cl_4 2(C_2H_5)O$, $MnTiCl_5 4C_2H_5OH$, $Mg_3V_2Cl_{12}$. $7CH_3COOC_2H_5$, $MgZrCl_6 4tetrahydrofuran$. Other catalysts may include cationic catalysts such as $AlCl_3$, and other cobalt and iron catalysts well known in the art.

The conventional-type transition metal catalyst compounds disclosed herein may be activated with one or more of the conventional-type cocatalysts described below.

Conventional Cocatalysts and Other Components

Conventional-type cocatalyst compounds for the above conventional-type transition metal catalyst compounds may be represented by the formula $M^3M^4_vX^2_cR^3_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Examples of conventional-type organometallic cocatalyst compounds of Group IA, IIA and IIIA useful with the conventional-type catalyst compounds described above include, but are not limited to, methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as trihexyl-aluminum, triethylaluminum, trimethylaluminum, and tri-isobutylaluminum. Other conventional-type cocatalyst compounds may include mono-organohalides and hydrides of Group IIA metals, and mono- or di-organohalides and hydrides of Group IHA metals. Non-limiting examples of such conventional-type cocatalyst compounds may include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415.

Metallocene Catalysts

Metallocene catalysts may include "half sandwich," (i.e., at least one ligand) and "full sandwich," (i.e., at least two ligands) compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocene(s)" or "metallocene catalyst compound(s)."

The one or more metallocene catalyst compounds may be represented by the formula (I):

$$Cp^ACp^BMX_n \qquad (I)$$

The metal atom "M" of the metallocene catalyst compound, as described throughout the specification and claims, may be selected from the group consisting of Groups 3 through 12 atoms and lanthanide Group atoms; selected from the group consisting of Groups 4, 5 and 6 atoms; Ti, Zr, Hf atoms, or Zr. The groups bound the metal atom "M" are such that the compounds described below in the formulas and structures are neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

M is as described above; each X is chemically bonded to M; each Cp group is chemically bonded to M; and n is 0 or an integer from 1 to 4, or either 1 or 2.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. $Cp^A$ and $Cp^B$ may be independently selected from the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof.

More particular non-limiting examples of alkyl substituents R associated with formula (i) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. Two adjacent R groups, when present, may be joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in formula (I) may be independently selected from the group consisting of: any leaving group, for example, halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. X may also be $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons, and substituted derivatives thereof. X may also be selected from hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls. X may also be selected from hydride, chloride, fluoride, methyl, phenyl, phenoxy, benzoxy, tosyl, fluoromethyls and fluorophenyls. X may be selected from $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls. X may be selected from fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls).

The metallocene catalyst compound and/or component may include those of formula (I) where $Cp^A$ and $Cp^B$ are bridged to each other by at least one bridging group, (A), such that the structure is represented by formula (II):

$$Cp^A(A)Cp^BMX_n \qquad (II)$$

These bridged compounds represented by formula (II) are known as "bridged metallocenes". $Cp^A$, $Cp^B$, M, X and n are as defined above for formula (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (I) including halogen radicals and iron. More particular non-limiting examples of bridging group (A) are represented by $C_1$ to $C_6$ alkylenes, substituted $C_1$ to $C_6$ alkylenes, oxygen, sulfur, R'$_2$C=, R'$_2$Si=, —Si(R')$_2$Si(R'$_2$)—, R'$_2$Ge=, R'P= (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. The bridged metallocene catalyst compound of formula (II) may have two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

The bridging group (A) may also be cyclic, comprising, for example 4 to 10, 5 to 7 ring members. The ring members may be selected from the elements mentioned above, from one or more of B, C, Si, Ge, N and O. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents may be selected from the group consisting of hydrocarbyl (e.g., alkyl such as methyl) and halogen (e.g., F, Cl). The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formula (I) and (II) may be different from each other or the same as each other.

The metallocene catalyst compounds may include monoligand metallocene compounds (e.g., mono cyclopentadienyl catalyst components) such as described in WO 93/08221 for example which is incorporated herein by reference.

The at least one metallocene catalyst compound may be an unbridged "half sandwich" metallocene represented by the formula (IV):

wherein $Cp^A$ is defined as for the Cp groups in (I) and is a ligand that is bonded to M; each Q is independently bonded to M; Q is also bound to $Cp^A$; X is a leaving group as described above in (I); n ranges from 0 to 3, or is 1 or 2; q ranges from 0 to 3, or is 1 or 2. $Cp^A$ may be selected from the group consisting of cyclopentadienyl, indenyl, tetrahydroindenyl, fluorenyl, substituted version thereof, and combinations thereof.

In formula (IV), Q is selected from the group consisting of $ROO^-$, $RO-$, $R(O)-$, $-NR-$, $-CR_2-$, $-S-$, $-NR_2$, $-CR_3$, $-SR$, $-SiR_3$, $-PR_2$, $-H$, and substituted and unsubstituted aryl groups, wherein R is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. R may be selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, and $C_6$ to $C_{12}$ aryloxys. Non-limiting examples of Q include $C_1$ to $C_{12}$ carbamates, $C_1$ to $C_{12}$ carboxylates (e.g., pivalate), $C_2$ to $C_{20}$ allyls, and $C_2$ to $C_{20}$ heteroallyl moieties.

Described another way, the "half sandwich" metallocenes above can be described as in formula (II), such as described in, for example, U.S. Pat. No. 6,069,213:

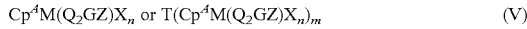

wherein M, $Cp^A$, X and n are as defined above;

$Q_2GZ$ forms a polydentate ligand unit (e.g., pivalate), wherein at least one of the Q groups form a bond with M, and is defined such that each Q is independently selected from the group consisting of $-O-$, $-NR-$, $-CR_2-$ and $-S-$; G is either carbon or silicon; and Z is selected from the group consisting of R, $-OR$, $-NR_2$, $-CR_3$, $-SR$, $-SiR_3$, $-PR_2$, and hydride, providing that when Q is $-NR-$, then Z is selected from the group consisting of $-OR$, $-NR_2$, $-SR$, $-SiR_3$, $-PR_2$; and provided that neutral valency for Q is satisfied by Z; and wherein each R is independently selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. R may be selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;

n may be 1 or 2;

T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "Cp$^4$M(Q$_2$GZ)X$_n$" groups, and is chemically bonded to the Cp$^4$ groups;

m may be an integer from 1 to 7; or m may be an integer from 2 to 6.

The metallocene catalyst compound may be described more particularly in structures (VIa), (VIb), (VIc), (VId), (VIe), and (VIf):

(VIa-i)
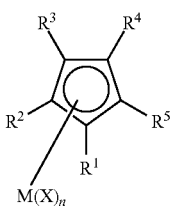

(VIa-ii)
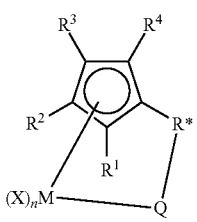

(VIb)
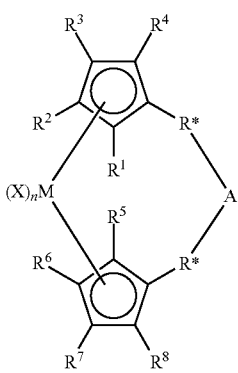

(VIc)
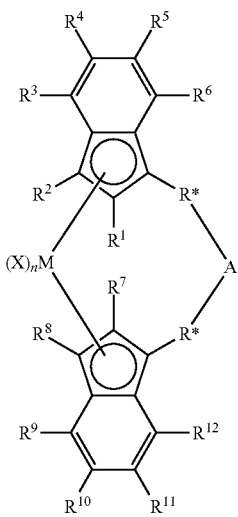

(VId)
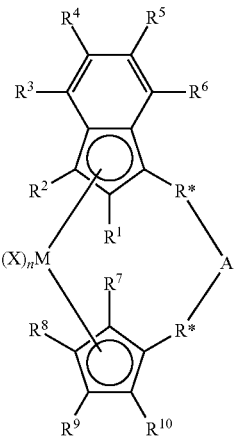

(VIe)
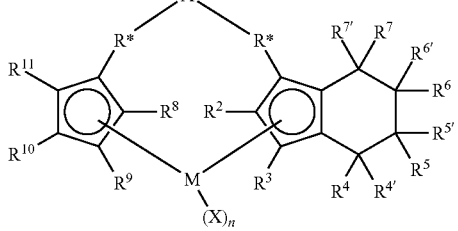

(VIf)
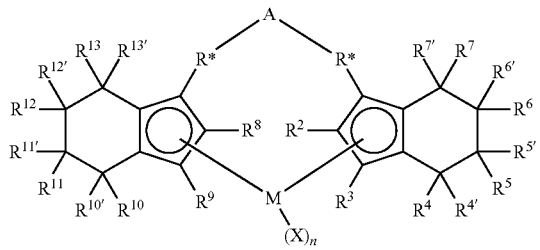

wherein in structures (VIa) to (VIf), M is selected from the group consisting of Group 3 to Group 12 atoms, selected from the group consisting of Group 3 to Group 10 atoms, selected from the group consisting of Group 3 to Group 6 atoms, selected from the group consisting of Group 4 atoms, selected from the group consisting of Zr and Hf or is Zr; wherein Q in (VIa) to (VIf) is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, alkylenes, aryls, arylenes, alkoxys, aryloxys, amines, arylamines (e.g., pyridyl) alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates; wherein the saturated groups defining Q may comprise from 1 to 20 carbon atoms; and wherein the aromatic groups may comprise from 5 to 20 carbon atoms; wherein R* may be selected from divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additionally, R* may be from the group of divalent hydrocarbylenes and heteroatom-containing hydrocarbylenes, selected from the group consisting of alkylenes, substituted alkylenes and heteroatom-containing hydrocarbylenes, selected from the group consisting of $C_1$ to $C_{12}$ alkylenes, $C_1$ to $C_{12}$ substituted alkylenes, and $C_1$ to $C_{12}$ heteroatom-containing hydrocarbylenes, or selected from the group consisting of $C_1$ to $C_4$ alkylenes. Both R* groups may be identical in structures (VIf).

A is as described above for (A) in structure (II), and more particularly, selected from the group consisting of a chemical bond, —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups; or selected from the group consisting of $C_5$ to $C_8$ cyclic hydrocarbons, —CH$_2$CH$_2$—, =CR$_2$ and =SiR$_2$; wherein R is selected from the group consisting of alkyls, cycloalkyls, aryls, alkoxys, fluoroalkyls and heteroatom-containing hydrocarbons; R is selected from the group consisting of $C_1$ to $C_6$ alkyls, substituted phenyls, phenyl, and $C_1$ to $C_6$ alkoxys; or R is selected from the group consisting of methoxy, methyl, phenoxy, and phenyl; or A may be absent, in which case each R* is defined as for $R^1$-$R^{13}$; each X is as described above in (I); n is an integer from 0 to 4, or from 1 to 3, or from 1 or 2; and $R^1$ through $R^{13}$ are independently: selected from the group consisting of hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos. through $R^{13}$ may also be selected independently from $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls; or hydrogen radical, fluorine radical, chlorine radical, methyl, ethyl, propyl, isopropyl, butyl, isobutyl, tertiary butyl, hexyl, phenyl, 2,6-di-methylpheyl, and 4-tertiarybutylpheyl groups; wherein adjacent R groups may form a ring, either saturated, partially saturated, or completely saturated.

The structure of the metallocene catalyst component represented by (VIa) may take on many forms such as disclosed in, for example, U.S. Pat. Nos. 5,026,798, 5,703, 187, and 5,747,406, including a dimer or oligomeric structure, such as disclosed in, for example, U.S. Pat. Nos. 5,026,798 and 6,069,213.

For the metallocene represented in (VId), $R^1$ and $R^2$ form a conjugated 6-membered carbon ring system that may or may not be substituted.

It is contemplated that the metallocene catalysts compounds described above include their structural or optical or enantiomeric isomers (racemic mixture), or may be a pure enantiomer.

As used herein, a single, bridged, asymmetrically substituted metallocene catalyst compound having a racemic and/or meso isomer does not, itself, constitute at least two different bridged, metallocene catalyst compounds.

The "metallocene catalyst compound" may comprise any combination of the above described features.

Metallocene compounds and catalysts are known in the art and any one or more may be utilized herein. Suitable metallocenes include but are not limited to all of the metallocenes disclosed and referenced in the U.S. patents cited above, as well as those disclosed and referenced in U.S. Pat. Nos. 7,179,876, 7,169,864, 7,157,531,7,129,302, 6,995,109, 6,958,306, 6,884748, 6,689,847, U.S. Patent Application publication number 2007/0055028, and published PCT Application Nos. WO 97/22635, WO 00/699/22, WO 01/30860, WO 01/30861, WO 02/46246, WO 02/50088, WO 04/026921, and WO 06/019494, all fully incorporated herein by reference. Additional catalysts suitable for use herein include those referenced in U.S. Pat. Nos. 6,309,997, 6,265,338, U.S. Patent Application publication number 2006/019925, and the following articles: Chem Rev 2000, 100, 1253, Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Group 15-Containing Catalysts

The supported catalyst composition may include one or metallocene catalysts as described above and/or other conventional polyolefin catalysts, as well as Group 15 atom containing catalysts described below.

"Group 15 atom containing" catalysts or "Group 15-containing" catalysts may include complexes of Group 3 to 12 metal atoms, wherein the metal atom is 2 to 8 coordinate, the coordinating moiety or moieties including at least two Group 15 atoms, and up to four Group 15 atoms. The Group 15-containing catalyst component may be a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460, EP A1 0 893 454, U.S. Pat. Nos. 5,318,935, 5,889,128, 6,333,389 B2 and 6,271,325 B1.

The Group 15-containing catalyst components may include Group 4 imino-phenol complexes, Group 4 bis (amide) complexes, and Group 4 pyridyl-amide complexes that are active towards olefin polymerization to any extent.

The Group 15-containing catalyst components may include $HN(CH_2CH_2N(2,4,6-Me_3phenyl))_2MX_2$, and $HN(CH_2CH_2N(2,3,4,5,6-Me_5phenyl))_2MX_2$, wherein M is Zr or Hf, and X is selected from F, Cl, Br, I, Me, benzyl, $CH_2SiMe_3$, and $C_1$ to $C_5$ alkyls or alkenyls.

The Group 15-containing catalyst component may include a bisamide compound such as $[(2,3,4,5,6\ Me_5C_6)NCH_2CH_2]_2NHZrBz_2$.

Mixed Catalysts

Additionally one type of catalyst compound described above can be combined with another type of catalyst compound described herein with one or more activators or activation methods described below.

It is further contemplated that other catalysts can be combined with the metallocene catalyst compounds described herein. For example, see U.S. Pat. Nos. 4,937,299, 4,935,474, 5,281,679, 5,359,015, 5,470,811, and 5,719,241.

Additionally, one or more metallocene catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090.

Activators and Activation Methods for Catalyst Compounds

An activator is defined in a broad sense as any combination of reagents that increases the rate at which a transition metal compound oligomerizes or polymerizes unsaturated monomers, such as olefins. The catalyst compounds may be activated for oligomerization and/or polymerization catalysis in any manner sufficient to allow coordination or cationic oligomerization and/or polymerization.

Additionally, the activator may be a Lewis-base, such as for example, diethyl ether, dimethyl ether, ethanol, or methanol. Other activators that may be used include those described in WO 98/07515 such as tris (2,2',2"-nonafluorobiphenyl) fluoroaluminate.

Combinations of activators may be used. For example, alumoxanes and ionizing activators may be used in combinations, see for example, EP-B1 0 573 120, WO 94/07928 and WO 95/14044 and U.S. Pat. Nos. 5,153,157 and 5,453,410. WO 98/09996 describes activating metallocene catalyst compounds with perchlorates, periodates and iodates including their hydrates. WO 98/30602 and WO 98/30603 describe the use of lithium (2,2'-bisphenyl-ditrimethylsilicate).4THF as an activator for a metallocene catalyst compound. WO 99/18135 describes the use of organo-boron-aluminum activators. EP-B1-0 781 299 describes using a silylium salt in combination with a non-coordinating compatible anion. WO 2007/024773 suggests the use of activator-supports which may comprise a chemically-treated solid oxide, clay mineral, silicate mineral, or any combination thereof. Also, methods of activation such as using radiation (see EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in, for example, U.S. Pat. Nos. 5,849,852, 5,859,653 and 5,869,723 and PCT WO 98/32775.

Alumoxanes may also be utilized as an activator in the catalyst composition. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in, for example, U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, WO 94/10180 and WO 99/15534. A visually clear methylalumoxane may be used. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, disclosed in U.S. Pat. No. 5,041,584).

An ionizing or stoichiometric activator, neutral or ionic, such as tri (n-butyl) ammonium tetrakis (pentafluorophenyl) boron, a trisperfluorophenyl boron metalloid precursor or a trisperfluoronapthyl boron metalloid precursor, polyhalogenated heteroborane anions (see, for example, WO 98/43983), boric acid (see, for example, U.S. Pat. No. 5,942,459) or combinations thereof, may also be used. The neutral or ionic activators may be used alone or in combination with alumoxane or modified alumoxane activators.

Examples of neutral stoichiometric activators may include tri-substituted boron, tellurium, aluminum, gallium and indium or mixtures thereof. The three substituent groups may be each independently selected from the group of alkyls, alkenyls, halogen, substituted alkyls, aryls, arylhalides, alkoxy and halides. The three substituent groups may be independently selected from the group of halogen, mono or multicyclic (including halosubstituted) aryls, alkyls, and alkenyl compounds and mixtures thereof; or alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternatively, the three groups are alkyls having 1 to 4 carbon groups, phenyl, napthyl or mixtures thereof. The three groups may be halogenated, for example fluorinated, aryl groups. In yet other illustrative examples, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in, for example, European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124.

Supports

The above described catalyst compounds may be combined with one or more supports using one of the support methods well known in the art or as described below. For example, in the catalyst compound may be used in a supported form, such as, deposited on, contacted with, or incorporated within, adsorbed or absorbed in, or on the support.

As used herein, the term "support" refers to compounds comprising Group 2, 3, 4, 5, 13 and 14 oxides and chlorides. Suitable supports include, for example, silica, magnesia, titania, zirconia, montmorillonite, phyllosilicate, alumina, silica-alumina, silica-chromium, silica-titania, magnesium chloride, graphite, magnesia, titania, zirconia, montmorillonite, phyllosilicate, and the like.

The support may possess an average particle size in the range of from about 0.1 to about 500 µm, or from about 1 to about 200 µm, or from about 1 to about 50 µm, or from about 5 to about 50 µm.

The support has an average pore size in the range of from about 10 to about 1000 Å, or about 50 to about 500 Å, or 75 to about 350 Å.

The support may have a surface area in the range of from about 10 to about 700 m$^2$/g, or from about 50 to about 500 m$^2$/g, or from about 100 to about 400 m$^2$/g.

The support has a pore volume in the range of from about 0.1 to about 4.0 cc/g, or from about 0.5 to about 3.5 cc/g, or from about 0.8 to about 3.0 cc/g.

The support, such as an inorganic oxide, has a surface area in the range of from about 10 to about 700 m$^2$/g, a pore volume in the range of from about 0.1 to about 4.0 cc/g, and an average particle size in the range of from about 1 to about 500 µm. Alternatively, the support can have a surface area in the range of from about 50 to about 500 m$^2$/g, a pore volume of from about 0.5 to about 3.5 cc/g, and an average particle size of from about 10 to about 200 µm. The surface area of the support can also be in the range from about 100 to about 400 m$^2$/g, a pore volume of from about 0.8 to about 3.0 cc/g and an average particle size of from about 5 to about 100 µm.

The catalyst compounds may be supported on the same or separate supports together with an activator, or the activator may be used in an unsupported form, or may be deposited on a support different from the supported catalyst compound.

There are various other methods in the art for supporting a polymerization catalyst compound. For example, the catalyst compound may contain a polymer bound ligand as described in, for example, U.S. Pat. Nos. 5,473,202 and 5,770,755; the catalyst may be spray dried as described in, for example, U.S. Pat. No. 5,648,310; the support used with the catalyst may be functionalized as described in European publication EP-A-0 802 203, or at least one substituent or leaving group is selected as described in U.S. Pat. No. 5,688,880.

Supported Catalyst Compositions and Methods of Preparation

The supported catalyst compositions disclosed herein may comprise a porous particulate support as hereinbefore disclosed, one or more catalyst compounds as hereinbefore disclosed and one or more activator compounds as hereinbefore disclosed.

The one or more catalyst compounds may comprise a titanium, a zirconium, or a hafnium atom. The catalyst compound may comprise:

(pentamethylcyclopentadienyl)(propylcyclopentadienyl) MX$_2$,
(tetramethylcyclopentadienyl)(propylcyclopentadienyl) MX$_2$,
(tetramethylcyclopentadienyl)(butylcyclopentadienyl) MX$_2$,
Me$_2$Si(indenyl)$_2$MX$_2$,
Me$_2$Si(tetrahydroindenyl)$_2$MX$_2$,
(n-propyl cyclopentadienyl)$_2$MX$_2$,
(n-butyl cyclopentadienyl)$_2$MX$_2$,
(1-methyl, 3-butyl cyclopentadienyl)$_2$MX$_2$,
HN(CH$_2$CH$_2$N(2,4,6-Me$_3$phenyl))$_2$MX$_2$,
HN(CH$_2$CH$_2$N(2,3,4,5,6-Me$_5$phenyl))$_2$MX$_2$,
(propyl cyclopentadienyl)(tetramethylcyclopentadienyl) MX$_2$,
(butyl cyclopentadienyl)$_2$MX$_2$,
(propyl cyclopentadienyl)$_2$MX$_2$, and mixtures thereof,
wherein M is Zr or Hf, and X is selected from F, Cl, Br, I, Me, benzyl, CH$_2$SiMe$_3$, and
C$_1$ to C$_5$ alkyls or alkenyls.

The supported catalyst composition may comprise two or more catalyst compounds comprising a titanium, a zirconium, or a hafnium atom. The two or more catalyst compounds may comprise one or more metallocene compounds and one or more Group 15 containing metal compounds. The metallocene compound may comprise (pentamethylcyclopentadienyl)(propylcyclopentadienyl) MX$_2$,
(tetramethylcyclopentadienyl)(propylcyclopentadienyl) MX$_2$,
(tetramethylcyclopentadienyl)(butylcyclopentadienyl) MX$_2$,
Me$_2$Si(indenyl)$_2$MX$_2$,
Me$_2$Si(tetrahydroindenyl)$_2$MX$_2$,
(n-propyl cyclopentadienyl)$_2$MX$_2$,
(n-butyl cyclopentadienyl)$_2$MX$_2$,
(1-methyl, 3-butyl cyclopentadienyl)$_2$MX$_2$,
(propyl cyclopentadienyl)(tetramethylcyclopentadienyl) MX$_2$,
(butyl cyclopentadienyl)$_2$MX$_2$,
(propyl cyclopentadienyl)$_2$MX$_2$, and mixtures thereof,
wherein M is Zr or Hf, and X is selected from F, Cl, Br, I, Me, benzyl, CH$_2$SiMe$_3$, and C$_1$ to C$_5$ alkyls or alkenyls.

The Group 15 metal containing compound may comprise HN(CH$_2$CH$_2$N(2,4,6-Me$_3$phenyl))$_2$MX$_2$ or HN(CH$_2$CH$_2$N(2,3,4,5,6-Me$_5$phenyl))$_2$MX$_2$, wherein M is Zr or Hf, and X is selected from F, Cl, Br, I, Me, benzyl, CH$_2$SiMe$_3$, and C$_1$ to C$_5$ alkyls or alkenyls.

The supported catalyst composition may comprise two catalyst compounds selected from:

(pentamethylcyclopentadienyl)(propylcyclopentadienyl) MX$_2$, (tetramethylcyclopentadienyl)(propylcyclopentadienyl)
  MX$_2$,
(tetramethylcyclopentadienyl)(butylcyclopentadienyl)
  MX$_2$,
Me$_2$Si(indenyl)$_2$MX$_2$,
Me$_2$Si(tetrahydroindenyl)$_2$MX$_2$,
(n-propyl cyclopentadienyl)$_2$MX$_2$,
(n-butyl cyclopentadienyl)$_2$MX$_2$,
(1-methyl, 3-butyl cyclopentadienyl)$_2$MX$_2$,
(propyl cyclopentadienyl)(tetramethylcyclopentadienyl)
  MX$_2$,
(butyl cyclopentadienyl)$_2$MX$_2$ or
(propyl cyclopentadienyl)$_2$MX$_2$, and
HN(CH$_2$CH$_2$N(2,4,6-Me$_3$phenyl))$_2$MX$_2$ or
HN(CH$_2$CH$_2$N(2,3,4,5,6-Me$_5$phenyl))$_2$MX$_2$,
  wherein M is Zr or Hf, and X is selected from the group
    consisting of F, Cl, Br, I, Me,
  benzyl, CH$_2$SiMe$_3$, and C1 to C5 alkyls or alkenyls.

The supported catalyst compositions may comprise a liquid diluent content of 7% or less, or 6% or less, or 5% or less, or 4% or less, or 3% or less. The supported catalyst compositions may comprise a toluene content of 7% or less, or 6% or less, or 5% or less, or 4% or less, or 3% or less.

The supported catalyst composition may comprise a porous particulate silica, methylalumoxone, one or more catalyst compounds as hereinbefore described and a toluene content of 7% or less, or 6% or less, or 5% or less, or 4% or less, or 3% or less based on the total weight of the supported catalyst composition.

Methods for making the supported catalyst compositions may involve forming a suspension of one or more porous particulate supports, one or more catalyst compounds and one or more activator compounds in one or more liquid diluents, and then spray drying the suspension. The suspension may be formed by combining, blending, mixing, modifying or the like.

The supported catalyst composition may be formed by combining one or more catalyst compounds with one or more activator compounds and then combining the resulting mixture with one or more porous particulate supports. The supported catalyst composition may be formed by combining one or more activator compounds with one or more porous particulate supports and then combining the resulting mixture with one or more catalyst compounds. The components may be combined in the presence of a liquid diluent. The diluent employed in forming the suspension may be a material capable of dissolving or suspending the catalyst compound and the activator compound, and suspending the porous particulate support. For example, hydrocarbons such as linear or branched alkanes including n-hexane, n-pentane and isopentane; aromatics such as toluene and xylene; and halogenated hydrocarbons such as dichloromethane are useful as the diluent. The diluent may have a boiling point from about 0° C. to about 150° C.

The same or different diluents may be used for the catalyst compound and the activator compound.

In one method the activator may comprise an alumoxane, for example, methylalumoxane or modified methylalumoxane. In one method the diluent may comprise toluene.

The contact time for the one or more activators and one or more catalyst compounds may vary depending on one or more of the conditions of, temperature and pressure, the type of mixing apparatus, and the quantities of the components to be combined.

The combining of the one or more activators with one or more catalyst compounds may take place over a period from between about 1 minute and 2 hours.

After combining, the one or more activators and one or more catalyst compounds, the resulting mixture may be held for a period from between about 1 minute and 2 hours. Alternatively, after combining the one or more activators and one or more catalyst compounds the resulting mixture may be held up to three days. The mixture may be held at a temperature from 10° C. to 100° C., from 10° C. to 50° C., or from 15° C. to 35° C.

The mixture of activator compounds and catalyst compounds may then be added to the porous particulate support. The porous particulate support may be slurried in a suitable liquid diluent prior to the addition. The liquid diluent may comprise toluene.

The combining of the mixture of one or more activators and one or more catalyst compounds with one or more porous particulate supports may take place over a period from about 1 minute to about 2 hours.

After combining, the of one or more activators, one or more catalyst compounds and one or more porous particulate supports, the mixture may be held for a period between about 1 minute and 2 hours. Alternatively, after combining the one or more activators, one or more catalyst compounds and one or more porous particulate supports, the mixture may be held for up to three days. The mixture may be held at a temperature from 10° C. to 100° C., from 10° C. to 50° C., or from 15° C. to 35° C.

The use of spray drying in the present disclosure includes the use of a large flow of hot gas to rapidly evaporate the liquid diluent from the suspension thereby forming the supported catalyst of the present disclosure. The suspension is feed into the drying chamber as a fine mist formed or "atomized" using nozzles, rotary disks or wheels. In the drying chamber the liquid diluent evaporates, which helps to cool the drying gas and the supported catalyst of the present disclosure. The drying gas, the evaporated diluent liquid and the supported catalyst then pass from the drying chamber to a particle separation unit, such as a cyclone or bag house, where the supported catalyst is collected. The ratio of the flow rates of the hot gas and the diluent liquid, the temperatures of these two streams and the physical properties such as the heat of vaporization of the diluent liquid help to determine the temperature of the materials exiting the drying chamber. For example, for a production rate of 25 kg/hr of supported catalyst composition from a suspension at 35° C. containing a total of 10 weight % dissolved plus suspended components, a nitrogen flow of 3500 kg/hr at 150° C. would produce the supported catalyst composition at a drying chamber exit temperature of 80° C. to 120° C., where the exact temperature would be dependent upon the specific identity of the components.

So, spray drying may be performed by atomizing the suspension with a nozzle or a centrifugal high speed disc atomizer into a stream of heated inert drying gas, such as nitrogen, argon, or propane to evaporate the diluent and produce solid-form particles of supported catalyst and activator in a matrix of support material. The volumetric flow of the drying gas may be considerably larger than the volumetric flow of the suspension. Spray drying the suspension to form the supported catalyst composition includes proving the suspension a residence time of 5 seconds to 60 seconds in the drying chamber. Alternatively, spray drying the suspension to form the supported catalyst composition includes proving the suspension a residence time of 5 seconds to 45 seconds or a residence time of 5 seconds to 30 seconds in the drying chamber.

The amounts of catalyst compound and activator compound employed in the suspension of catalyst, activator and support material may depend on the nature of the activator. When the activator is a branched or cyclic alumoxane the mole ratio of aluminum atoms (from the activator) to transition metal (from the catalyst compound) in the suspension may be between about 10 and about 5000, or between about 50 to about 1000, or between about 100 to about 500.

The amount of porous particulate support employed in forming the suspension may be from about 1 to about 80 percent by weight, or from about 10 to about 60 percent by weight, or from about 20 to about 50 percent by weight, based on the total weight of the supported catalyst composition.

The spray dried, supported catalyst composition may be a particulate material containing at least one activator compound and at least one catalyst compound in a matrix of at least one inert support material. The particles of supported catalyst composition may have an average particle size of 5 to 500, or from 10 to 80, micrometers.

A feature of the method of preparation of the supported catalyst composition is that after forming a suspension comprising one or more porous particulate supports, one or more activator compounds and one or more catalyst compounds in one or more liquid diluents the suspension is spray dried to form the supported catalyst composition. Where the weight of the solids in the suspension is greater than 200 kg the time taken for the spray drying step is 10 hours or less. Where the weight of the solids in the suspension is greater than 200 kg the time taken for spray drying may be 9 hours or less, or 8 hours or less, or 7 hours or less, or 6 hours or less, or 5 hours or less, or 4 hours or less, or 3 hours or less. The time may be between 2 hours and 10 hours, or between 2 hours and 8 hours.

The suspension may be spray dried so that the supported catalyst composition has a residual liquid content after spray drying of 10% by weight or less, 7% by weight or less, or 5% by weight or less, or 4% by weight or less, or 3% by weight or less, or 2% by weight or less. The suspension may be spray dried so that the toluene content of the supported catalyst composition after spray drying is 10% by weight or less, is 7% by weight or less, or 5% by weight or less, or 4% by weight or less, or 3% by weight or less, or 2% by weight or less The weight of solids in the suspension may be greater than 300 kg, or greater than 400 kg, or greater than 500 kg.

The time taken for step a) may be substantially the same as the time taken for step b). The time taken for step a) may be within 2 hours of the time taken for step b). The time taken for step a) may be within 1 hour of the time taken for step b).

The suspension may have a weight percent of solids in the liquid vehicle between about 5% by weight and about 60% by weight, or between about 10% by weight and about 50% by weight, or between about 20% by weight and about 40% by weight.

The suspension may be spray dried at a rate between about 100 kg/hr and 1000 kg/hr, or between about 200 kg/hr and about 800 kg/hr. Suspension refers to the mixture of solids and diluent.

The porous particulate support may comprise a particulate Group 2, 3, 4, 5, 13 and 14 oxide or chloride. The porous particulate support may comprise a particulate silica. The porous particulate support may be dehydrated at an elevated temperature.

The porous particulate support may have an average particle size in the range of from about 0.1 to about 500 µm, or from about 1 to about 200 µm, or from about 1 to about 50 µm, or from about 5 to about 50 µm.

In one embodiment a suspension in toluene liquid diluent of particulate silica, methylalumoxane, and one or more catalyst compounds may be spray dried at a rate sufficient to produce at least 200 kg of supported catalyst composition in a time of 10 hours or less and having a toluene content of 7% by weight or less.

In another embodiment a suspension in toluene liquid diluent of particulate silica, methylalumoxane, and one or more catalyst compounds may be spray dried at a rate sufficient to produce at least 300 kg of supported catalyst composition in a time of 10 hours or less and having a toluene content of 7% by weight or less.

In another embodiment a suspension in toluene liquid diluent of particulate silica, methylalumoxane, and one or more catalyst compounds may be spray dried at a rate sufficient to produce at least 400 kg of supported catalyst composition in a time of 10 hours or less and having a toluene content of 7% by weight or less.

In another embodiment a suspension in toluene liquid diluent of particulate silica, methylalumoxane, and one or more catalyst compounds may be spray dried at a rate sufficient to produce at least 500 kg of supported catalyst composition in a time of 10 hours or less and having a toluene content of 7% by weight or less.

In any of the above embodiments the suspension may be spray dried at a rate sufficient to produce a supported catalyst composition in a time of 10 hours or less and having a toluene content of 6% by weight or less, or 5% by weight or less, or 4% by weight or less, or 3% by weight or less.

In any of the above embodiments the suspension may be spray dried at a rate sufficient to produce a supported catalyst composition in a time of 7 hours or less and having a toluene content of 6% by weight or less, or 5% by weight or less, or 4% by weight or less, or 3% by weight or less.

In any of the above embodiments the suspension may be spray dried at a rate sufficient to produce a supported catalyst composition in a time of 5 hours or less and having a toluene content of 6% by weight or less, or 5% by weight or less, or 4% by weight or less, or 3% by weight or less.

In another embodiment a suspension in toluene liquid diluent of particulate silica, methylalumoxane, and one or more catalyst compounds may be spray dried at a rate sufficient to produce at least 500 kg of supported catalyst composition in a time of 7 hours or less and having a toluene content of 4% by weight or less.

The supported catalyst composition may be retained in substantially dry and/or free flowing form or may be reslurried in a suitable liquid. The supported catalyst composition may be mixed with a suitable protective material such as mineral oil for storage.

Continuity Additives/Aids

It may also be desirable to use one or more continuity additives to, for example, aid in regulating static levels in polymerization reactors. The continuity additive may be used as a part of the supported catalyst composition or introduced directly into the reactor independently of the supported catalyst composition. The continuity additive may be supported on the inorganic oxide of the supported catalyst composition described herein.

Non-limiting examples of continuity additives include, amide-hydrocarbon or ethoxylated-amide compounds such as described as "surface modifiers" in WO 96/11961; carboxylate compounds such as aryl-carboxylates and long chain hydrocarbon carboxylates, and fatty acid-metal complexes; alcohols, ethers, sulfate compounds, metal oxides and other compounds known in the art. Some specific examples of continuity additives include 1,2-diether organic compounds, magnesium oxide, ARMOSTAT 310, ATMER 163, ATMER AS-990, and other glycerol esters, ethoxylated amines (e.g., N,N-bis(2-hydroxyethyl)octadecylamine), alkyl sulfonates, and alkoxylated fatty acid esters; STADIS 450 and 425, KEROSTAT CE 4009 and KEROSTAT CE 5009. chromium N-oleylanthranilate salts, calcium salts of a Medialan acid and di-tert-butylphenol; POLYFLO 130, TOLAD 511 (a-olefin-acrylonitrile copolymer and polymeric polyamine), EDENOL D32, aluminum stearate, sorbitan-monooleate, glycerol monostearate, methyl toluate, dimethyl maleate, dimethyl furnarate, triethylamine, 3,3-diphenyl-3-(imidazol-1-yl)-propin, and like compounds.

Any of the aforementioned additional continuity additives may be employed either alone or in combination.

Other continuity additives useful in embodiments disclosed herein are well known to those in the art. Regardless of which continuity additives are used, care should be exercised in selecting an appropriate continuity additive to avoid introduction of poisons into the reactor. In addition, in selected embodiments, the smallest amount of the continuity additives necessary to bring the static charge into alignment with the desired range should be used.

The continuity additives may be added to the reactor as a combination of two or more of the above listed continuity additives. The continuity additive(s) may be added to the reactor in the form of a solution or a slurry, such as a slurry with a mineral oil, and may be added to the reactor as an individual feed stream or may be combined with other feeds prior to addition to the reactor. For example, the continuity additive may be combined with the supported catalyst or supported catalyst slurry prior to feeding the combined catalyst-static control agent mixture to the reactor.

The continuity additives may be added to the reactor in an amount ranging from about 0.05 to about 200 ppmw, or from about 2 to about 100 ppmw, or from about 2 to about 50 ppmw, based on the polymer production rate. The continuity additives may also be added to the reactor in an amount of about 2 ppmw or greater, based on the polymer production rate.

Methods of Using the Supported Catalyst Compositions

One skilled in the art recognizes that depending on the olefin polymerization composition used, certain conditions of temperature and pressure would be required to prevent, for example, a loss in the activity of the catalyst system.

The supported catalyst composition as hereinbefore disclosed may be introduced directly into the polymerization reactor as a substantially dry powder. The catalyst may be in the form of a slurry in a suitable liquid.

It will be appreciated that the exact method of introduction may vary depending on one or more of the conditions, temperature and pressure, the type of mixing apparatus, and the quantities of the components to be combined.

Polymerization Processes

Polymerization processes may include solution, gas phase, slurry phase and a high pressure process or a combination thereof. In illustrative embodiments, a gas phase or slurry phase polymerization of one or more olefins at least one of which is ethylene or propylene is provided. The reactor may be a gas phase fluidized bed polymerization reactor.

The supported catalyst compositions prepared by the methods as hereinbefore described are suitable for use in any prepolymerization and/or polymerization process over a wide range of temperatures and pressures. The temperatures may be in the range of from −60° C. to about 280° C., from 50° C. to about 200° C.; from 60° C. to 120° C. from 70° C. to 100° C. or from 80° C. to 95° C.

The olefin polymerization process may be a solution, high pressure, slurry or gas phase polymerization process of one or more olefin monomers having from 2 to 30 carbon atoms, preferably 2 to 12 carbon atoms, and more preferably 2 to 8 carbon atoms. The process is particularly well suited to the polymerization of two or more olefins or comonomers such as ethylene, propylene, 1-butene, 1-pentene, 4-methyl-1-pentene, 1-hexene, 1-octene 1-decene or the like.

Other olefins useful in the polymerization process include ethylenically unsaturated monomers, diolefins having 4 to 18 carbon atoms, conjugated or nonconjugated dienes, polyenes, vinyl monomers and cyclic olefins. Useful monomers may include, but are not limited to, norbornene, norbornadiene, isobutylene, isoprene, vinylbenzocyclobutane, styrenes, alkyl substituted styrene, ethylidene norbornene, dicyclopentadiene and cyclopentene. In an illustrative embodiment of the present process, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. In another embodiment of the polymerization process, ethylene or propylene is polymerized with at least two different comonomers, optionally one of which may be a diene, to form a terpolymer.

The polymerization process may be directed to a polymerization process, particularly a gas phase or slurry phase process, for polymerizing propylene alone or with one or more other monomers including ethylene, and/or other olefins having from 4 to 12 carbon atoms. The polymerization process may comprise contacting ethylene and optionally an alpha-olefin with one or more of the catalyst compositions as hereinbefore described in a reactor under polymerization conditions to produce the ethylene polymer or copolymer.

Suitable gas phase polymerization processes are described in, for example, U.S. Pat. Nos. 4,543,399, 4,588, 790, 5,028,670, 5,317,036, 5,352,749, 5,405,922, 5,436,304, 5,453,471, 5,462,999, 5,616,661, 5,668,228, 5,627,242, 5,665,818, and 5,677,375, and European publications EP-A-0 794 200, EP-A-0 802 202, EP-A2 0 891 990, and EP-B-634 421.

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization process is referred to as a particle form polymerization, or a slurry process where the temperature is kept below the temperature at which the polymer goes into solution. Such technique is well known in the art, and described in for instance U.S. Pat. No. 3,248, 179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484. Examples of solution processes are described in U.S. Pat. Nos. 4,271,060, 5,001,205, 5,236,998 and 5,589,555.

EXAMPLES

It is to be understood that while the present disclosure has been described in conjunction with the specific embodiments thereof, the foregoing description is intended to illustrate and not limit the scope of the disclosure. Other aspects, advantages and modifications will be apparent to those skilled in the art to which the disclosure pertains. Therefore, the following examples are put forth so as to provide those skilled in the art with a complete disclosure and description of how to make and use the disclosed compositions, and are not intended to limit the scope of the disclosure.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited are herein fully incorporated by reference for all jurisdictions in which such incorporation is permitted and to the extent such disclosure is consistent with the description of the present disclosure.

Preparation of Spray Dried Supported Catalyst Compositions

To a stirred vessel was added toluene and a 10 percent by weight solution of methylalumoxane in toluene (Albemarle Corporation, Baton Rouge, La.). Subsequently a 25 weight percent solution of bis(1-methyl-3-n-butylcyclopentadienyl) zirconium dichloride (MCN) in toluene was added. The mixture was held at 27° C. for one hour. A separate stirred vessel was charged with silica (Davison 948 or 955 grade silica, available from W. R. Grace, Davison Chemical Division, Baltimore, Md.), previously dehydrated at 600° C. The methylaumoxane/catalyst mixture was then added to the silica and the resulting mixture stirred for one hour. A 10 wt % solution of an antistatic additive (bis 2-hydroxyethyl stearyl amine) was added and allowed to mix for one hour. The catalyst suspension was transferred to a spray dryer agitated feed vessel and fed to the dryer. After reaching steady-state operation, the product was collected. Table 1 shows the quantities of raw materials, spray drying conditions and catalyst analyses.

TABLE 1

| | | Catalyst | | | |
|---|---|---|---|---|---|
| | | 1 | 2 | 3 | 4 |
| | | | Silica | | |
| | Type | 955 | 955 | 948 | 948 |
| Charge Weights | | | | | |
| Toluene | kg | 11.5 | 11.4 | 11.3 | 11.3 |
| 10% MAO in toluene | kg | 8.5 | 8.5 | 8.5 | 8.5 |

TABLE 1-continued

| | | Catalyst | | | |
|---|---|---|---|---|---|
| | | 1 | 2 | 3 | 4 |
| | | | Silica | | |
| | Type | 955 | 955 | 948 | 948 |
| Silica | kg | 2.3 | 2.3 | 2.3 | 2.3 |
| 25% MCN in Toluene | g | 245 | 245 | 245 | 245 |
| Contained Cat | wt % | 14.6 | 14.6 | 14.6 | 14.6 |
| Spray Drying Conditions | | | | | |
| Inlet Temp | C. | 165.1 | 165.0 | 165.1 | 165.0 |
| Outlet Temp | C. | 107.6 | 114.1 | 105.6 | 113.2 |
| Gas Flow | kg/hr | 344 | 339 | 344 | 343 |
| Feedstock Flow | kg/hr | 49 | 34 | 49 | 40 |
| Atomizer Speed | RPM | 21,600 | 21,600 | 21,600 | 21,600 |
| Product Collection | g | 838 | 864 | 802 | 902 |
| Analysis | | | | | |
| Al | wt % | 12.2 | 12.2 | 11.4 | 11.9 |
| Zr | wt % | 0.45 | 0.46 | 0.4 | 0.43 |
| Al/Zr | mol/mol | 91.6 | 89.6 | 96.3 | 93.5 |
| Toluene | wt % | 3.2 | 2.7 | 3.8 | 2.9 |
| $d_{10}$ | μ | 8.8 | 9.9 | 17.9 | 19.9 |
| $d_{50}$ | μ | 39.7 | 39.3 | 49 | 49.6 |
| $d_{90}$ | μ | 78.1 | 75.7 | 86.7 | 87.3 |

Preparation of Catalysts Using Conventional Drying

Catalyst I:

To a stirred vessel was added 575 kg of toluene and 481 kg of a 30 percent by weight solution of methylalumoxane in toluene (Albemarle Corporation, Baton Rouge, La.) followed by a line flush of 49 kg of toluene. Subsequently 42 kg of a 25 weight percent solution of bis(1-methyl-3-n-butylcyclopentadienyl) zirconium dichloride in toluene was added followed by two line flushes of 49 kg of toluene. The mixture was held at 27° C. for one hour. A separate stirred vessel was charged with 386 kg of silica (Davison 948 silica, available from W. R. Grace, Davison Chemical Division, Baltimore, Md.), previously dehydrated at 600° C. The methylaumoxane/catalyst mixture was then added to the silica and the transfer line flushed 136 kg of toluene and the resulting mixture stirred for one hour. 27 kg of a 10 wt % solution of an antistatic additive (bis 2-hydroxyethyl stearyl amine) was added, followed by a line rinse of 49 kg of toluene and allowed to mix for one hour. The supported catalyst was dried at 73.9° C. under a vacuum of 0.255 to 0.186 bar absolute with a 9.07 kg/hr nitrogen flow rate. Total drying time was 18 hr.

Catalyst II:

To a stirred vessel was added 760 kg of toluene and 481 kg of a 30 percent by weight solution of methylalumoxane in toluene (Albemarle Corporation, Baton Rouge, La.) followed by a line flush of 49 kg of toluene. Subsequently 42 kg of a 25 weight percent solution of bis(n-propylcyclopentadienyl) hafnium dimethyl in toluene was added followed by two line flushes of 49 kg of toluene. The mixture was held at 27° C. for one hour. 386 kg of silica (PQ ES70 silica, available from PQ Corporation, Conshohocken, Pa.), previously dehydrated at 600° C. was added and the resulting mixture stirred for one hour. The catalyst was dried at 73.9° C. under a vacuum of 0.255 to 0.186 bar absolute with a 9.07 kg/hr nitrogen flow rate. Total drying time was 18.6 hr. Total toluene added was 1275 kg (69 wt % toluene). After 5 hr drying, the supported catalyst contained about 51 wt % toluene. After 10 hours drying, the supported catalyst contained about 22% toluene. Table 2 shows the quantity of toluene recovered from the catalyst and the calculated toluene content of the catalyst and toluene mixture. A total of 1097 kg of toluene of the 1275 kg toluene added was recovered. The remaining 178 kg of toluene was contained in the nitrogen flow to the stirred vessel and exited the process. The toluene recovered represents the total liquid condensed. When the concentration of toluene in the nitrogen sparge was below the dew point, no additional liquid toluene was recovered, but toluene still was evolving from the catalyst and exiting the system. Therefore the results in Table 2 represent the minimum amount of toluene in the process, as the toluene exiting with the nitrogen was not included.

TABLE 2

| Time (hr) | Toluene Recovered (kg) | Toluene Content (wt %) |
| --- | --- | --- |
| 1 | 53 | 65.9 |
| 2 | 158 | 63.5 |
| 3 | 245 | 61.2 |
| 4 | 400 | 56.3 |
| 5 | 540 | 50.7 |
| 6 | 659 | 44.8 |
| 7 | 742 | 39.6 |
| 8 | 819 | 34.0 |
| 9 | 882 | 28.4 |
| 10 | 946 | 21.8 |
| 11 | 1,007 | 14.2 |
| 12 | 1,059 | 6.6 |
| 13 | 1,085 | 2.1 |
| 14 | 1,094 | 0.4 |
| 15 | 1,096 | 0.1 |

Laboratory Polymerization Tests

A 2 liter autoclave reactor under nitrogen purge was charged with 0.20 mmole of triisobutyl aluminum TIBAL in hexane, followed by 1-hexene comonomer (60 ml) and 800 ml isobutane diluent. The contents of the reactor were heated to 80° C., after which, about 50 mg of catalyst composition and 3 mg aluminum di-stearate were introduced concurrently with ethylene into the reactor to make up a total reactor pressure of 22.4 barg. The reactor temperature was maintained at 85° C., and the polymerization was allowed to proceed. After 90 minutes the reactor was cooled, ethylene and isobutane vented off and the polymer dried and weighed to obtain the yield. Table 3 compares the polymerization results of catalysts 1-4 prepared above and of a control catalyst prepared with conventional vacuum drying.

TABLE 3

| | Catalyst (mg) | Yield (grams) | Productivity (g/g-cat·hr) |
| --- | --- | --- | --- |
| 1 | 45.0 | 250 | 3,710 |
| 2 | 44.6 | 250 | 3,740 |
| 3 | 44.6 | 253 | 3,780 |
| 4 | 44.7 | 200 | 2,980 |
| Control | 45.0 | 203 | 3,010 |

Pilot Plant Polymerization Tests

Supported catalysts prepared by spray drying and conventional drying were also tested in a continuous pilot-scale gas phase fluidized bed reactor having a 0.6 meters internal diameter and 4.4 meters in bed height. The fluidized bed was made up of polymer granules and the gaseous feed streams of ethylene and hydrogen together with liquid 1-hexene comonomer were introduced below the reactor bed into the recycle gas line. The individual flow rates of ethylene, hydrogen and 1-hexene were controlled to maintain fixed composition targets. The ethylene concentration was controlled to maintain a constant ethylene partial pressure. The hydrogen was controlled to maintain constant hydrogen to ethylene mole ratio. The concentrations of all the gases were measured by an on-line gas chromatograph to ensure relatively constant composition in the recycle gas stream. The reacting bed of growing polymer particles was maintained in a fluidized state by the continuous flow of the make-up feed and recycle gas through the reaction zone. A superficial gas velocity of about 0.7 meters/sec was used to achieve this. The reactor was operated at a total pressure of 2200 kPa. The fluidized bed was maintained at a constant height by withdrawing a portion of the bed at a rate equal to the rate of formation of particulate product. The polymer production rate was in the range of 60-70 kg/hour. The product was removed semi-continuously via a series of valves into a fixed volume chamber. This product was purged to remove entrained hydrocarbons and treated with a small stream of humidified nitrogen to deactivate any trace quantities of residual catalyst.

The catalyst composition 4 prepared by the inventive spray drying method gave a productivity of 7,010 kg polymer/kg catalyst and the catalyst composition prepared by conventional vacuum drying gave a productivity of 6,920 kg polymer/kg catalyst. Furthermore the reactor skin temperatures and static measurements indicated that the spray dried catalyst composition performed well without process upsets.

Preparation of Large Scale Spray Dried Supported Catalyst Compositions

To a stirred vessel was added 575 kg of toluene and 481 kg of a 30 percent by weight solution of methylalumoxane in toluene (Albemarle Corporation, Baton Rouge, La.) followed by a line flush of 49 kg of toluene. Subsequently 42 kg of a 25 weight percent solution of bis(1-methyl-3-n-butylcyclopentadienyl) zirconium dichloride in toluene was added followed by two line flushes of 49 kg of toluene. The mixture was held at 27° C. for one hour. A separate stirred vessel was charged with 386 kg of silica (Davison 948 silica, available from W. R. Grace, Davison Chemical Division, Baltimore, Md.), previously dehydrated at 600° C. The methylaumoxane/catalyst mixture was then added to the silica and the transfer line flushed 136 kg of toluene and the resulting mixture stirred for one hour. 27 kg of a 10 wt % solution of an antistatic additive was added, followed by a line rinse of 49 kg of toluene and allowed to mix for one hour. The catalyst suspension was transferred to a spray dryer agitated feed vessel and fed to the dryer at a feed rate of 368 kg/hr with an inlet temperature of 165° C. and an outlet temperature of 113° C. with an atomizer speed of 21,600 rpm. 552 kg of supported catalyst composition catalyst were produced with a zirconium content of about 0.4 wt % and an aluminum content of about 12.5 wt %. The supported catalyst composition was spray dried in about 5 hours.

What is claimed is:

1. A method for producing a supported catalyst composition for olefin polymerization comprising the steps of:
   a) forming a suspension comprising one or more porous particulate supports, one or more activator compounds and one or more catalyst compounds in one or more liquid diluents, wherein step a) is performed in a time of 5 hours or less; and
   b) spray drying the suspension to form a supported catalyst composition;

wherein step b) is performed at a rate sufficient to produce at least 200 kg of supported catalyst composition in a time of 5 hours or less.

2. A method according to claim 1, wherein supported catalyst composition has a residual liquid content after spray drying of 10% by weight or less.

3. A method according to claim 1, wherein step b) is performed at a rate sufficient to produce at least 500 kg of supported catalyst composition in a time of 10 hours or less.

4. A method according to claim 1, wherein the suspension has a weight percent of solids in the liquid diluent between about 5% by weight and about 60% by weight.

5. A method according to claim 1, wherein the suspension is spray dried at a rate between about 100 kg/hr and 1000 kg/hr.

6. A method according to claim 1, wherein the porous particulate support comprises (i) a particulate Group 2, 3, 4, 5, 13 and 14 oxide or chloride or (ii) a particulate silica.

7. A method according to claim 1, wherein the porous particulate support has an average particle size in the range of from about 0.1 to about 500 µm.

8. A method according to claim 1, wherein the one or more activator compounds comprises an organometallic compound.

9. A method according to claim 1, wherein the one or more activator compounds comprises an alumoxane or a neutral or ionic stoichiometric activator.

10. A method according to claim 1, wherein the one or more activator compounds comprises a methylalumoxane or a modified methylalumoxane.

11. A method according to claim 1, wherein the liquid diluent comprises an aliphatic or aromatic hydrocarbon.

12. A method according to claim 1, wherein the liquid diluent comprises toluene.

13. A method according to claim 1, wherein the one or more catalyst compounds comprises a titanium, a zirconium or a hafnium atom.

14. A method according to claim 1, wherein the catalyst compound comprises:

(pentamethylcyclopentadienyl)(propylcyclopentadienyl)$MX_2$,
(tetramethylcyclopentadienyl)(propylcyclopentadienyl)$MX_2$,
(tetramethylcyclopentadienyl)(butylcyclopentadienyl)$MX_2$,
$Me_2Si(indenyl)_2MX_2$,
$Me_2Si(tetrahydroindenyl)_2MX_2$,
(n-propyl cyclopentadienyl)$_2MX_2$,
(n-butyl cyclopentadienyl)$_2MX_2$,
(1-methyl, 3-butyl cyclopentadienyl)$_2MX_2$,
$HN(CH_2CH_2N(2,4,6-Me_3phenyl))_2MX_2$,
$HN(CH_2CH_2N(2,3,4,5,6-Mesphenyl))_2MX_2$,
(propyl cyclopentadienyl)(tetramethylcyclopentadienyl)$MX_2$,
(butyl cyclopentadienyl)$_2MX_2$,
(propyl cyclopentadienyl)$_2MX_2$, and mixtures thereof,
wherein M is Zr or Hf, and X is selected from F, Cl, Br, I, Me, benzyl, $CH_2SiMe_3$, and $C_1$ to $C_5$ alkyls or alkenyls.

15. A method according to claim 1 wherein a suspension in toluene liquid diluent of particulate silica, methylalumoxane, and one or more catalyst compounds is spray dried at a rate sufficient to produce at least 200 kg of supported catalyst composition in a time of 5 hours or less and having a toluene content of 7% by weight or less.

16. A method according to claim 1 wherein a suspension in toluene liquid diluent of particulate silica, methylalumoxane, and one or more catalyst compounds is spray dried at a rate sufficient to produce at least 500 kg of supported catalyst composition in a time of 5 hours or less and having a toluene content of 7% by weight or less.

17. A method according to claim 1, spray drying the suspension to form the supported catalyst composition includes proving the suspension a residence time of 5 seconds to 60 seconds in a drying chamber.

* * * * *